US011740530B2

(12) United States Patent
Telfer et al.

(10) Patent No.: US 11,740,530 B2
(45) Date of Patent: Aug. 29, 2023

(54) ELECTRO-OPTIC MEDIA INCLUDING OPPOSITELY CHARGED PARTICLES AND VARIABLE TRANSMISSION DEVICE INCORPORATING THE SAME

(71) Applicant: E INK CORPORATION, Billerica, MA (US)

(72) Inventors: Stephen J. Telfer, Arlington, MA (US); Thomas H. Whitesides, Victoria (CA)

(73) Assignee: E Ink Corporation, Billerica, MA (US)

(*) Notice: Subject to any disclaimer, the term of this patent is extended or adjusted under 35 U.S.C. 154(b) by 114 days.

(21) Appl. No.: 17/097,265

(22) Filed: Nov. 13, 2020

(65) Prior Publication Data

US 2021/0149267 A1 May 20, 2021

Related U.S. Application Data

(60) Provisional application No. 62/935,455, filed on Nov. 14, 2019.

(51) Int. Cl.
*G02F 1/167* (2019.01)
*G02F 1/1333* (2006.01)
*G02F 1/1343* (2006.01)
*G09G 3/34* (2006.01)
*G02F 1/1675* (2019.01)

(52) U.S. Cl.
CPC ............ *G02F 1/167* (2013.01); *G02F 1/1343* (2013.01); *G02F 1/133377* (2013.01); *G09G 3/344* (2013.01); *G02F 2001/1678* (2013.01)

(58) Field of Classification Search
CPC .. G02F 1/133377; G02F 1/167; G02F 1/1343; G02F 2001/1678; G09G 3/344

USPC ........................................... 345/87, 107
See application file for complete search history.

(56) References Cited

U.S. PATENT DOCUMENTS

| | | | |
|---|---|---|---|
| 5,872,552 A | 2/1999 | Gordon, II et al. | |
| 6,130,774 A | 10/2000 | Albert et al. | |
| 6,144,361 A | 11/2000 | Gordon, II et al. | |
| 6,172,798 B1 | 1/2001 | Albert et al. | |
| 6,184,856 B1 | 2/2001 | Gordon, II et al. | |

(Continued)

FOREIGN PATENT DOCUMENTS

WO  2011136474 A2  11/2011

OTHER PUBLICATIONS

Korean Intellectual Property Office, PCT/US2020/060370, International Search Report and Written Opinion, dated Feb. 26, 2021.

(Continued)

*Primary Examiner* — Jimmy H Nguyen
(74) *Attorney, Agent, or Firm* — Brian D. Bean

(57) ABSTRACT

A variable transmission electro-optic medium includes an encapsulated bistable dispersion containing a plurality of electrically charged particles and a fluid, the charged particles being movable by application of an electric field and capable of being switched between an open state and a closed state. The plurality of electrically charged particles may include a first set of charged particles and a second set of charged particles, such that a color of the first set of charged particles is the same as a color of the second set of charged particles, and the first set of charged particles has a polarity that is opposite to a polarity of the second set of charged particles.

16 Claims, 3 Drawing Sheets

(56) References Cited

U.S. PATENT DOCUMENTS

| | | |
|---|---|---|
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,323,989 B1 * | 11/2001 | Jacobson ............... B41J 2/02 345/107 |
| 6,822,782 B2 | 11/2004 | Honeyman |
| 6,866,760 B2 | 3/2005 | Paolini, Jr. et al. |
| 6,922,276 B2 | 7/2005 | Zhang et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,012,735 B2 | 3/2006 | Honeyman |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,144,942 B2 | 12/2006 | Zang et al. |
| 7,170,670 B2 | 1/2007 | Webber |
| 7,173,752 B2 | 2/2007 | Doshi et al. |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,411,719 B2 | 8/2008 | Paolini, Jr. et al. |
| 7,453,445 B2 | 11/2008 | Amundson |
| 7,535,624 B2 | 5/2009 | Amundson et al. |
| 7,561,324 B2 | 7/2009 | Duthaler et al. |
| 7,679,814 B2 | 3/2010 | Paolini, Jr. et al. |
| 7,715,088 B2 | 5/2010 | Liang et al. |
| 7,839,564 B2 | 11/2010 | Whitesides et al. |
| 8,009,348 B2 | 8/2011 | Zehner et al. |
| 8,238,020 B2 | 8/2012 | Yamamoto et al. |
| 9,052,564 B2 | 6/2015 | Sprague et al. |
| 9,279,906 B2 | 3/2016 | Kang |
| 9,366,935 B2 | 6/2016 | Du et al. |
| 9,372,380 B2 | 6/2016 | Du et al. |
| 9,921,451 B2 | 3/2018 | Telfer et al. |
| 10,444,553 B2 | 10/2019 | Laxton |
| 2005/0270267 A1 * | 12/2005 | Johnson ............... G02F 1/167 345/107 |
| 2007/0002008 A1 | 1/2007 | Tam |
| 2007/0146310 A1 * | 6/2007 | Paolini ............... G02F 1/167 345/107 |
| 2011/0080633 A1 * | 4/2011 | Yamamoto ............... G02F 1/167 445/24 |
| 2012/0194899 A1 * | 8/2012 | Zhang ............... G02F 1/167 359/296 |
| 2014/0011913 A1 | 1/2014 | Du et al. |
| 2015/0005720 A1 | 1/2015 | Zang |
| 2016/0012710 A1 | 1/2016 | Lu et al. |
| 2018/0366069 A1 * | 12/2018 | Widger ............... G09G 3/344 |

OTHER PUBLICATIONS

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

* cited by examiner

ELECTRO-OPTIC MEDIA INCLUDING OPPOSITELY CHARGED PARTICLES AND VARIABLE TRANSMISSION DEVICE INCORPORATING THE SAME

RELATED APPLICATIONS

This application claims priority to U.S. Provisional Application No. 62/935,455, filed Nov. 14, 2019. All patents and publications disclosed herein are incorporated by reference in their entireties.

BACKGROUND OF INVENTION

Light modulators represent a potentially important market for electro-optic media. As the energy performance of buildings and vehicles becomes increasingly important, electro-optic media can be used as coatings on windows (including skylights and sunroofs) to enable the proportion of incident radiation transmitted through the windows to be electronically controlled by varying the optical state of the electro-optic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications of VT technology include privacy glass and glare-guards in electronic devices.

U.S. Pat. No. 7,327,511 describes variable transmission devices including charged pigment particles that are distributed in a non-polar solvent and encapsulated. These variable transmission devices can be driven to an open state with an AC driving voltage whereby the charged pigment particles are driven to the capsule walls. Accordingly, such variable transmission devices are useful for viewing surfaces where it is desirable to alter the transmissivity at will, such as privacy glass, sunroofs, and windows on buildings.

The '511 patent describes various factors which are important in adapting electrophoretic media for optimum performance in variable transmission devices. One important factor is minimizing haze. In this application, "haze" refers to the percentage of diffuse transmitted light (light that is scattered as it is transmitted), compared to total transmitted light. When using encapsulated electro-optic media, the haze can be reduced by index-matching the binder to be as close as possible to the index of refraction of the capsules retaining the switching medium.

Another property of electrophoretic media is bistability. The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

One method of maintaining the bistability of an electrophoretic medium is to ensure a weak attractive force between particles is present. For example, the aforementioned U.S. Pat. No. 7,170,670 describes an electrophoretic medium in which weak flocculation of particles is achieved by the addition to the fluid of a high molecular weight polymer, such as polyisobutylene, that is believed to cause depletion flocculation of the electrophoretic particles. Although this approach can give substantial improvements in bistability, the addition of the polymer to the fluid inevitably increases the viscosity of the fluid, and hence increases the switching time of the display, since the increased viscosity of the fluid reduces the rate of movement of the electrophoretic particles at any given electric field. A high concentration of the high molecular weight polymer also contributes to haze.

Thus, there is a need for improved bistable formulations of electrophoretic media that may be used in variable transmission devices.

SUMMARY OF INVENTION

In one aspect, a variable transmission electro-optic medium comprises an encapsulated bistable dispersion containing a plurality of electrically charged particles and a fluid, the charged particles being movable by application of an electric field and capable of being switched between an open state and a closed state. The plurality of electrically charged particles comprise a first set of charged particles and a second set of charged particles, such that a color of the first set of charged particles is the same as a color of the second set of charged particles, and the first set of charged particles has a polarity that is opposite to a polarity of the second set of charged particles.

In some embodiments, the variable transmission electro-optic medium comprises less than 10% of a stabilizing agent by weight of the dispersion. For example, the dispersion may be free of the stabilizing agent, which may be polyisobutylene, polystyrene, or poly(lauryl)methacrylate. In some embodiments, the color of first and second set of charged particles is selected from the group consisting of red, green, blue, cyan, magenta, yellow, white, and black. In some embodiments, the fluid is colorless. In some embodiments, the fluid is a color selected from the group consisting of red, green, blue, cyan, magenta, yellow, black and white. In some embodiments, a weight ratio of the first set of charged particles to the second set of charged particles within the dispersion is greater than 1.0. In some embodiments, the dispersion is encapsulated within a plurality of capsules and the medium further comprises a binder. In some embodiments, the variable transmission electro-optic medium is disposed between two light-transmissive electrodes. In some embodiments, the variable transmission electro-optic medium includes a polymeric sheet comprising a plurality of sealed microcells and the dispersion is encapsulated within the plurality of sealed microcells. In some embodiments, the variable transmission electro-optic medium includes a continuous polymeric phase and the dispersion is provided in a plurality of droplets encapsulated in the continuous polymeric phase.

In a second aspect, a variable transmission electro-optic medium comprising an encapsulated bistable dispersion including a plurality of electrically charged particles and a fluid, the charged particles being movable by application of an electric field and capable of being switched between an open state and a closed state, wherein the plurality of electrically charged particles comprises a first set of charged particles and a second set of charged particles, the first set of charged particles being light-transmissive and having an index of refraction that matches the index of refraction of the fluid, and the second set of charged particles having a charge polarity that is opposite to a polarity of the first set of charged particles. In some embodiments, the index of refraction of the fluid and the index of refraction of the first set of charged particles is between 1.51 and 1.57 at 550 nm.

In some embodiments, the variable transmission electro-optic medium comprises less than 10% of a stabilizing agent by weight of the dispersion. For example, the dispersion may be free of the stabilizing agent, which may be polyisobutylene, polystyrene, or poly(lauryl)methacrylate. In some embodiments, the color of the second set of charged particles is selected from the group consisting of red, green, blue, cyan, magenta, yellow, white, and black. In some embodiments, the fluid is colorless. In some embodiments, a weight ratio of the first set of charged particles to the second set of charged particles within the dispersion is greater than 1.0. In some embodiments, the dispersion is encapsulated within a plurality of capsules and the medium further comprises a binder. In some embodiments, the variable transmission electro-optic medium is disposed between two light-transmissive electrodes. In some embodiments, the variable transmission electro-optic medium includes a polymeric sheet comprising a plurality of sealed microcells and the dispersion is encapsulated within the plurality of sealed microcells. In some embodiments, the variable transmission electro-optic medium includes a continuous polymeric phase and the dispersion is provided in a plurality of droplets encapsulated in the continuous polymeric phase.

These and other aspects of the present invention will be apparent in view of the following description.

BRIEF DESCRIPTION OF DRAWINGS

The drawing Figures depict one or more implementations in accord with the present concepts, by way of example only, not by way of limitations. The drawings are not to scale. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

Generally, the various embodiments of the present invention provide electrophoretic media that may be incorporated into a variable transmission electro-optic device. In one embodiment, the electrophoretic media includes a bistable dispersion containing a plurality of charged particles having opposite charge polarity, but the same or substantially similar optical properties, such as color. The term "electro-optic", as applied to a material or a device, is used herein in its conventional meaning in the imaging art to refer to a material having first and second display states differing in at least one optical property, the material being changed from its first to its second display state by application of an electric field to the material.

Figure 1:
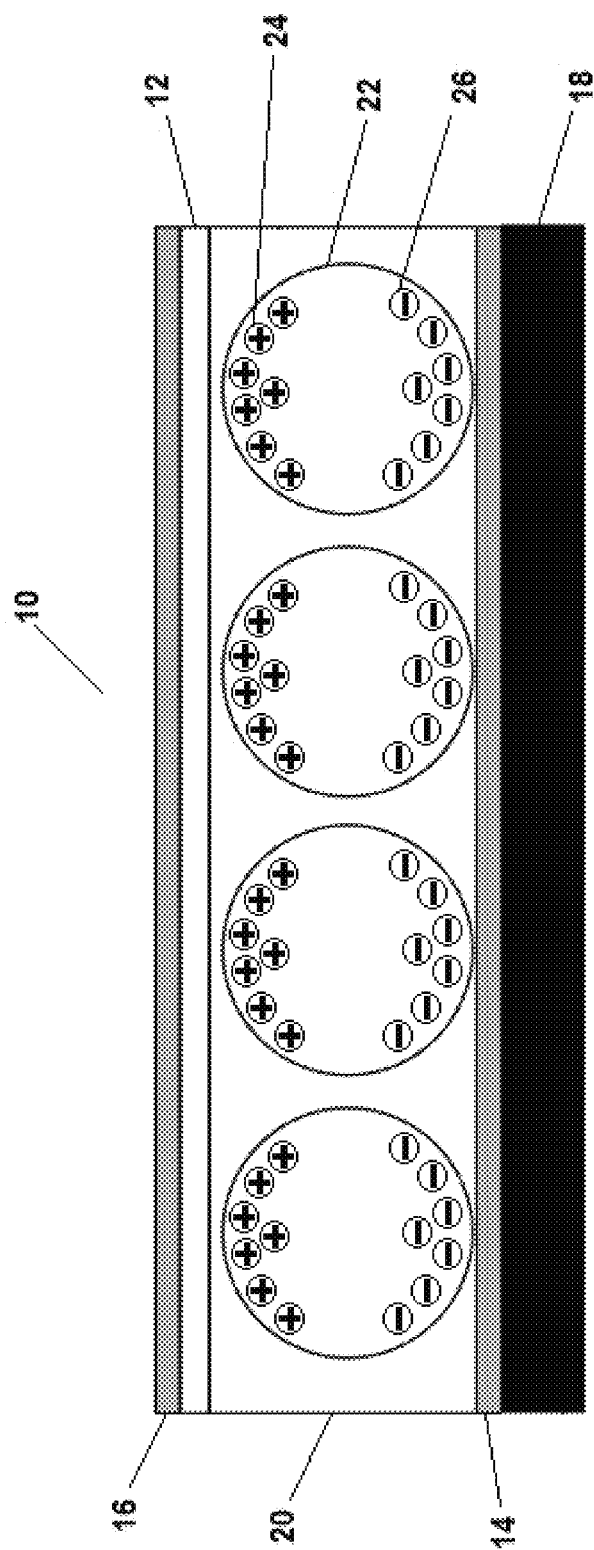
FIG. 1 is a schematic cross-sectional side view of an electro-optic display in a closed state according to an embodiment of the invention.

Referring now to FIG. 1, a variable transmission electro-optic device 10 containing a electrophoretic medium according to a first embodiment of the present invention is illustrated. The top layer 16 comprises a layer of light transmissive conductive material and may also include a light-transmissive protective sheet. For example, top layer 16 may comprise a glass or more preferably a flexible plastic sheet, such as polyethylene terephthalate, that is coated with a thin layer of a conductive material, such as a conductive metal, e.g. indium tin oxide, or a conductive polymer, e.g. PEDOT:PSS, for example. The term "light-transmissive" is used herein with respect to the various layers of the display to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths.

Below the top layer 16 is a layer of electrophoretic medium 20. Devices utilizing particle-based electrophoretic media can have attributes of good brightness and contrast, wide viewing angles, state bistability, and low power consumption when compared with liquid crystal displays, for example. The electrophoretic materials used in the various embodiments of the present invention are preferably solid in the sense that the materials have solid external surfaces, although the materials may, and often do, have internal liquid- or gas-filled spaces, and is preferably an encapsulated electrophoretic material.

The electrophoretic material is preferably bistable. The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element.

A layer comprising a second light transmissive electrode 14 is located on an opposing side of the layer of electrophoretic medium 20 relative to the first electrode 16. The electrode layers apply a potential across the layer of electrophoretic medium, so that the medium switches between an open state (light-transmissive) and a closed state (opaque) upon application of an electric field in a so-called "shutter mode." See, for example, U.S. Pat. Nos. 5,872,552; 6,130,774; 6,144,361; 6,172,798; 6,271,823; 6,225,971; and 6,184,856.

The electrode layers may be provided in several forms. For example, the electrode layer may be a continuous layer of conductive material. Alternatively, the electrodes may be divided into a plurality of segments of conductive material, such that each segment is independently controllable. In another embodiment, one or both of the electrode layers may be patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which may be independently addressed and defines one pixel of the device.

A substrate layer 18 may be provided as the bottom layer. The substrate 18 may comprise a temporary release sheet, which will be described in greater detail below, but the bottom substrate 16 is preferably another light transmissive protective sheet that may be the same or similar to the protective sheet incorporated in the top electrode layer 16 in the final manufactured device 10. In some embodiments, the substrate 18 is a light-transmissive supporting substrate, such as glass or a clear polymer. In some embodiments, the electro-optic device 10 will be disposed between two panes of glass, therefore providing a window whose transmission can be controlled electronically.

As illustrated in FIG. 1, when a DC field is applied to the device, the charged particles 24, 26 within a capsule 22 move toward one of the two electrodes 14, 16 depending on the polarity and magnitude of the applied electric field. For example in FIG. 1, the first set of particles 24 having a positive polarity are attracted to the top electrode 16, while the second set of particles 26 having a negative polarity are attracted to the bottom electrode 14, thereby changing the optical state of the device 10 to opaque and preventing light from being transmitted through the layer of electro-optic medium 20.

Figure 2:
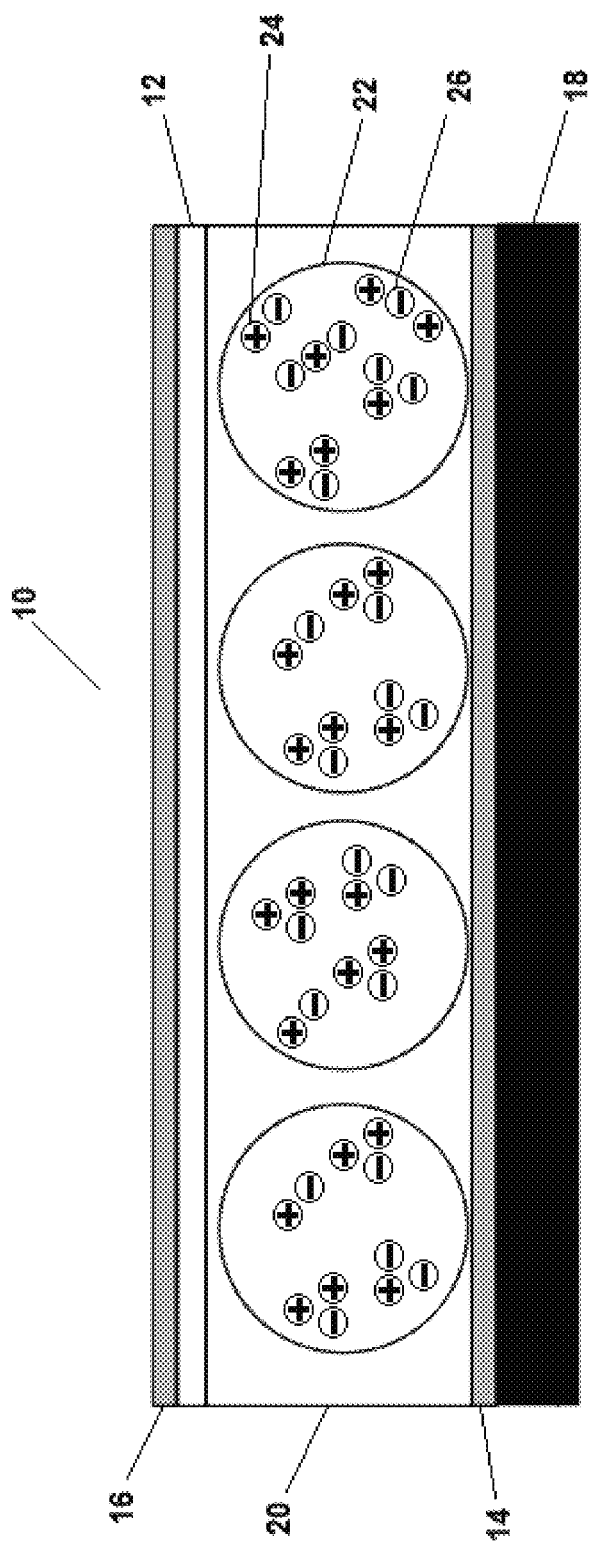
FIG. 2 is a schematic cross-sectional side view of the electro-optic display of FIG. 1 in an intermediate state.

Briefly switching the polarity of the electric field applied by the electrodes 14, 16 should allow the particles 24, 26 to mix in the middle of the capsules 22, as illustrated in FIG. 2. This will allow positively charged particles 24 to form hetero-agglomerations with negatively charged particles 26, thereby switching the device 10 to an intermediate optical state, wherein the amount of light that is able to be transmitted through the layer of electrophoretic media 20 is greater than the closed state.

Figure 3:
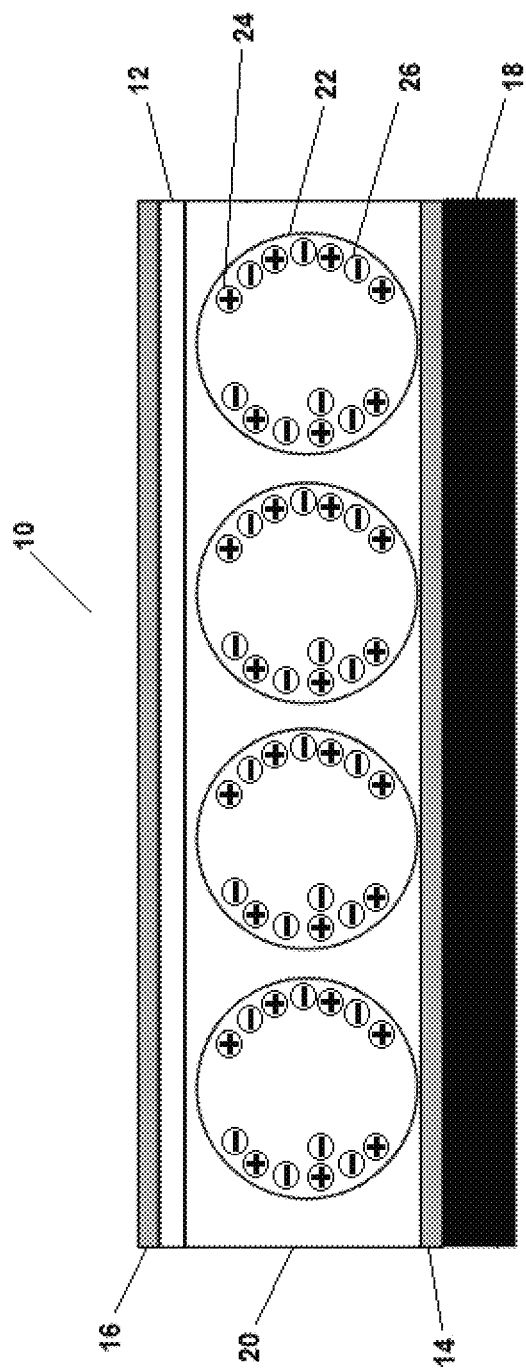
FIG. 3 is a schematic cross-sectional side view of the electro-optic display of FIG. 1 in an open state.

Now referring to FIG. 3, when an alternating electric field is applied to one of the electrodes 14, 16, the charged pigment particles 24, 26 may also mix and hetero-agglomerate similar to the intermediate state illustrated in FIG. 2, but the hetero-agglomerations of particles 24, 26 will also be driven to the side walls of the capsules 22, resulting in an aperture through the capsules 22 for the transmission of light through the layer of electrophoretic medium 20, thereby switching the device 10 to an open state.

As noted above, the electro-optic medium used in the various embodiments of the present invention is preferably an encapsulated electrophoretic medium. Numerous patents and applications assigned to or in the names of the Massachusetts Institute of Technology (MIT), E Ink Corporation, E Ink California, LLC and related companies describe various technologies used in encapsulated electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. Alternatively, the charged particles and the fluid are not encapsulated within microcapsules, but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and U.S. Patent Applications Publication No. and 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Whether encapsulated in a microcapsule, microcell, or droplet within a continuous polymeric phase, the dispersions containing the plurality of charged particles also contain a fluid, as well as other optional additives. The dispersion fluid is preferably a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291.

The charged pigment particles may be of a variety of colors and compositions. In some embodiments, all of the charged particles, regardless of charge polarity, may have the same or similar optical properties, such as color. In other embodiments, the first and second sets of oppositely charged particles may have different optical properties. In some embodiments, the first set of particles is colored (e.g., white, e.g., black) while the other set of particles is light-transmissive, and index-matched to meet the index of refraction of the internal phase of the electrophoretic medium. Additionally, the charged pigment particles may be functionalized with surface polymers to improve state stability. Such pigments are described in U.S. Pat. No. 9,921,451, which is incorporated by reference in its entirety. For example, if the charged particles are of a white color, they may be formed from an inorganic pigment such as $TiO_2$, $ZrO_2$, ZnO, $Al_2O_3$, $Sb_2O_3$, $BaSO_4$, $PbSO_4$ or the like. They may also be polymer particles with a high refractive index (>1.5) and of a certain size (>100 nm) to exhibit a white color, to be substantially light-transmissive, or composite particles engineered to have a desired index of refraction. Such particles may include, for example, poly(pentabromophenyl methacrylate), poly(2-vinylnapthalene), poly(naphthyl methacrylate), poly(alphamethylstyrene), poly(N-benzyl methacrylamide) or poly(benzyl methacrylate). Black charged particles, they may be formed from CI pigment black 26 or 28 or the like (e.g., manganese ferrite black spinel or copper chromite black spinel) or carbon black. Other colors (non-white and non-black) may be formed from organic pigments such as CI pigment PR 254, PR122, PR149, PG36, PG58, PG7, PB28, PB15:3, PY83, PY138, PY150, PY155 or PY20. Other examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. Color particles can also be formed from inorganic pigments, such as CI pigment blue 28, CI pigment green 50, CI pigment yellow 227, and the like. The surface of the charged particles may be modified by known techniques based on the charge polarity and charge level of the particles required, as described in U.S. Pat. Nos. 6,822,782, 7,002,728, 9,366,935, and 9,372,380 as well as US Publication No. 2014-0011913, the contents of all of which are incorporated herein by reference in their entireties.

The particles may exhibit a native charge, or may be charged explicitly using a charge control agent, or may acquire a charge when suspended in a solvent or solvent mixture. Suitable charge control agents are well known in the art; they may be polymeric or non-polymeric in nature or may be ionic or non-ionic. Examples of charge control agent may include, but are not limited to, Solsperse 17000 (active polymeric dispersant), Solsperse 9000 (active polymeric dispersant), OLOA® 11000 (succinimide ashless dispersant), Unithox 750 (ethoxylates), Span 85 (sorbitan trioleate), Petronate L (sodium sulfonate), Alcolec LV30 (soy lecithin), Petrostep B100 (petroleum sulfonate) or B70 (barium sulfonate), Aerosol OT, polyisobutylene derivatives or poly(ethylene co-butylene) derivatives, and the like. In addition to the suspending fluid and charged pigment particles, internal phases may include stabilizers, surfactants and charge control agents. A stabilizing material may be adsorbed on the charged pigment particles when they are dispersed in the solvent. This stabilizing material keeps the particles separated from one another so that the variable transmission medium is substantially non-transmissive when the particles are in their dispersed state.

As is known in the art, dispersing charged particles (typically a carbon black, as described above) in a solvent of low dielectric constant may be assisted by the use of a surfactant. Such a surfactant typically comprises a polar "head group" and a non-polar "tail group" that is compatible with or soluble in the solvent. In the present invention, it is preferred that the non-polar tail group be a saturated or unsaturated hydrocarbon moiety, or another group that is soluble in hydrocarbon solvents, such as for example a poly(dialkylsiloxane). The polar group may be any polar organic functionality, including ionic materials such as ammonium, sulfonate or phosphonate salts, or acidic or basic groups. Particularly preferred head groups are carboxylic acid or carboxylate groups. In some embodiments, dispersants, such as polyisobutylene succinimide and/or sorbitan trioleate, and/or 2-hexyldecanoic acid are added.

The dispersion may contain one or more stabilizers. Stabilizers suitable for use in the dispersions made according to the various embodiments of the present invention include, but are not limited to, polyisobutylene and polystyrene. However, only a relatively low concentration of stabilizer may be necessary. A low concentration of stabilizer may assist in maintaining the media in the closed (opaque) or intermediate state, but the size of the heteroagglomerates of the oppositely charged particles in the open state would be effectively stable without the presence of a stabilizer. For example, the dispersions incorporated in the various embodiments of the present invention may contain, with increasing preference in the amounts listed, less than or equal to 10%, 9%, 8%, 7%, 6%, 5%, 4%, 3%, 2%, and 1% stabilizer based on the weight of the dispersion. In some embodiments, the dispersion may be free of stabilizer.

In some embodiments, the concentration of stabilizer may also be reduced by providing a dispersion in which the concentration of a first set of charged particles is greater than the concentration of a second set of charged particles having an opposite polarity and encapsulating the dispersion in a charged microcapsule. For example, in one embodiment, a dispersion may be prepared having a first set of positively charged particles and a second set of negatively charged particles, wherein the concentration of the first set of positively charged particles is greater than the negatively charged particles. When the dispersion is encapsulated in a microcapsule having a negatively charged capsule wall and switched to an open state, the heteroagglomerates may have a net positive charge because of the presence of more positively charged particles within the heteragglomerates. As a result, the heteroagglomerates will be attracted to the negatively charged capsule wall, thereby improving the stability of the open state when an electric field is removed. The weight ratio of the first set of charged particles to the second set of charged particles within the dispersion may be greater than 1.0, more preferably, with increasing preference in the ratios listed, greater than or equal to 1.5, 2.0, 2.5, 3.0, 3.5, 4.0, 4.5, 5.0, 10.0, and 20.0.

The fluids used in the variable transmission media of the present invention will typically be of low dielectric constant (preferably less than 10 and desirably less than 3). The fluids are preferably solvents that have low viscosity, relatively high refractive index, low cost, low reactivity, and low vapor pressure/high boiling point. The fluids are preferably light transmissive and may or not have an optical property, such as color (e.g. red, green, blue, cyan, magenta, yellow, white, and black), that differs from the optical properties of at least one of the sets of charged particles of the dispersion. Examples of solvents include, but are not limited to, aliphatic hydrocarbons such as heptane, octane, and petroleum distillates such as Isopar (ID (Exxon Mobil) or Isane® (Total); terpenes such as limonene, e.g., 1-limonene; and aromatic hydrocarbons such as toluene. A particularly preferred solvent is limonene, since it combines a low dielectric constant (2.3) with a relatively high refractive index (1.47). The index of refraction of the internal phase may be modified with the addition of the index matching agents. For example, the aforementioned U.S. Pat. No. 7,679,814 describes an electrophoretic medium suitable for use in a variable transmission device in which the fluid surrounding the electrophoretic particles comprises a mixture of a partially hydrogenated aromatic hydrocarbon and a terpene, a preferred mixture being d-limonene and a partially hydrogenated terphenyl, available commercially as Cargille® 5040 from Cargille-Sacher Laboratories, 55 Commerce Rd, Cedar Grove N.J. 07009. In the encapsulated media made according to various embodiments of the present invention, it is preferred that the refractive index of the encapsulated dispersion match as closely as possible to that of the encapsulating material to reduce haze. In most instances, it is beneficial to have an internal phase with an index of refraction between 1.51 and 1.57 at 550 nm, preferably about 1.54 at 550 nm. In embodiments using a light-transmissive particle that is index matched to the internal phase, the light-transmissive particle will also have an index of refraction between 1.51 and 1.57 at 550 nm, preferably about 1.54 at 550 nm.

In a preferred embodiment of the present invention, the encapsulated fluid may comprise one or more nonconjugated olefinic hydrocarbons, preferably cyclic hydrocarbons. Examples of nonconjugated olefinic hydrocarbons include, but are not limited to terpenes, such as limonene; phenyl cyclohexane; hexyl benzoate; cyclododecatriene; 1,5-dimethyl tetralin; partially hydrogenated terphenyl, such as Cargille® 5040; phenylmethylsiloxane oligomer; and combinations thereof. A most preferred composition for the encapsulated fluid according to an embodiment of the present invention comprises cyclododecatriene and a partially hydrogenated terphenyl.

In some embodiments of the invention, the amount of stabilizing agent included in the encapsulated fluid may be lower than is traditionally used in electrophoretic displays. See, for contrast, U.S. Pat. No. 7,170,670. Such stabilizing agents may be large molecular weight free polymers such as polyisobutylene, polystyrene, or poly(lauryl)methacrylate. Accordingly, in some embodiments, the encapsulated fluid (i.e., dispersion) further comprises less than 10% of a stabilizing agent by weight of the dispersion. In some embodiments, the dispersion is free of the stabilizing agent. It is found that by reducing the presence of large molecular-weight polymers, the haze is improved, making the final product more pleasing.

Electrophoretic media comprising microcapsules also generally include a binder to assist in the coating of the electrophoretic media onto a substrate. A mixture of fish gelatin and a polyanion, such as acacia has been found to be an excellent binder for use with capsules formed from a coacervate of (pig) gelatin and acacia. Polyanions that may be included in the binder with fish gelatin include, but are not limited to, carbohydrate polymers, such as starch and cellulose derivatives, plant extracts (e.g. acacia), and polysaccharides (e.g. alginate); proteins, such as gelatin or whey protein; lipids, such as waxes or phospholipids; and combinations thereof.

The gelatin-based capsule walls have been described in many of the E Ink and MIT patents and applications mentioned above. The gelatin is available from various commercial suppliers, such as Sigma Aldrich or Gelitia USA. It can be obtained in a variety of grades and purity depending upon the needs of the application. Gelatin primarily comprises collagen that has been collected from animal products (cow, pig, poultry, fish) and hydrolyzed. It comprises a mixture of peptides and proteins. In many of the embodiments described herein, the gelatin is combined with acacia (gum arabic), which is derived from the hardened sap of the acacia tree. Acacia is a complex mixture of glycoproteins and polysaccharides, and it is often used as a stabilizer in foodstuffs. The pH of aqueous solutions of acacia and gelatin can be tuned to form a polymer-rich coacervate phase that can encapsulate droplets of a non-polar internal phase.

Capsules incorporating gelatin/acacia may be prepared as follows; see, for example U.S. Pat. No. 7,170,670, incorporated by reference in its entirety. In this process, an aqueous mixture of gelatin and/or acacia is emulsified with a hydrocarbon internal phase (or other water-immiscible phase which it is desired to encapsulate) to encapsulate the internal phase. The solution may be heated to 40° C. prior to emulsification—to dissolve the gelatin. The pH is typically lowered to form a coacervate after the desired drop size distribution is achieved. Capsules are formed upon controlled cooling and mixing of the emulsion—typically to room temperature or lower. Proper mixing and certain encapsulation formulations (e.g. gelatin & acacia concentrations & pH) to discretely gel the coacervate around the internal phase droplets in a uniform manner are achieved if the wetting and spreading conditions are correct, which is largely dictated by the internal phase composition. The process yields capsules in the range of 20-100 m and often incorporates over 50 percent of the starting materials into useable capsules. The capsules produced are then separated by size by sieving or other size exclusion sorting.

The manufacture of a multi-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing the second electrode layer and an appropriate arrangement of conductors to connect the electrodes to drive circuitry, is prepared. To form the final display, the substrate having the capsule/binder layer thereon is laminated to the backplane using a lamination adhesive. In one preferred form of such a process, the backplane is itself flexible and is prepared by printing the electrodes and conductors on a plastic film or other flexible substrate. The obvious lamination technique for mass production of displays by this process is roll lamination using a lamination adhesive.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass-produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The lamination adhesive may be present between any of the layers of the display stack, and the presence of this lamination adhesive layer affects the electro-optic characteristics of the displays. In particular, the electrical conductivity of the lamination adhesive layer affects both the low temperature performance and the resolution of the display. The low temperature performance of the display can (it has been found empirically) be improved by increasing the conductivity of the lamination adhesive layer, for example by doping the layer with tetrabutylammonium hexafluorophosphate or other materials as described in the aforementioned U.S. Pat. Nos. 7,012,735 and 7,173,752. In some embodiments, multiple layers of optically-clear adhesives may be used to maintain light transparency for the stack of light-transmissive electrodes, electo-optic medium, and supporting substrates.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

All of the contents of the aforementioned patents and applications are incorporated by reference herein in their entireties.

We claim:

1. A device comprising a layer of variable transmission electro-optic medium disposed between two light-transmissive electrodes, the variable transmission electro-optic medium comprising an encapsulated bistable dispersion including a plurality of electrically charged particles and a colorless fluid, the charged particles being movable by application of an electric field, and the device being capable of being switched between an open state, in which an observer can view light travelling through both light-transmissive electrodes and the variable transmission electro-optic medium, and a closed state, in which an observer cannot view light travelling through both light-transmissive electrodes and the variable transmission electro-optic medium, wherein the plurality of electrically charged particles comprise a first set of charged particles and a second set of charged particles, a color of the first set of charged particles is the same as a color of the second set of charged particles, and the first set of charged particles has a polarity that is opposite to a polarity of the second set of charged particles, wherein the closed state is achieved by applying a DC electric field between the two light-transmissive electrodes, and wherein the open state is achieved by applying an alternating electric field between the two light-transmissive electrodes.

2. The device of claim 1, wherein the dispersion further comprises less than 10% of a stabilizing agent by weight of the dispersion.

3. The device of claim 2, wherein the stabilizing agent is selected from the group consisting of polyisobutylene and polystyrene.

4. The device of claim 1, wherein the dispersion is free of a stabilizing agent.

5. The device of claim 1, wherein the color of first and second sets of charged particles are selected from the group consisting of red, green, blue, cyan, magenta, yellow, white, and black.

6. The device of claim 1, wherein a weight ratio of the first set of charged particles to the second set of charged particles within the dispersion is greater than 1.0.

7. The device of claim 1, wherein the dispersion is encapsulated within a plurality of capsules and the medium further comprises a binder.

8. The device of claim 1 further comprising a polymeric sheet comprising a plurality of sealed microcells and the dispersion is encapsulated within the plurality of sealed microcells.

9. The device of claim 1 further comprising a continuous polymeric phase and the dispersion is provided in a plurality of droplets encapsulated in the continuous polymeric phase.

10. The device of claim 1, wherein the device is disposed between two light-transmissive substrates.

11. A device comprising a layer of variable transmission electro-optic medium disposed between two light-transmissive electrodes, the variable transmission electro-optic medium comprising an encapsulated bistable dispersion including a plurality of electrically charged particles and a clear fluid, the charged particles being movable by application of an electric field and the device being capable of being switched between an open state, in which an observer can view light travelling through both light-transmissive electrodes and the variable transmission electro-optic medium, and a closed state, in which an observer cannot view light travelling through both light-transmissive electrodes and the variable transmission electro-optic medium, wherein the plurality of electrically charged particles comprises a first set of charged particles and a second set of charged particles, the first set of charged particles being light-transmissive and having an index of refraction that matches the index of refraction of the fluid, and the second set of charged particles having a charge polarity that is opposite to a polarity of the first set of charged particles, wherein the closed state is achieved by applying a DC electric field between the two light-transmissive electrodes, and wherein the open state is achieved by applying an alternating electric field between the two light-transmissive electrodes.

12. The device of claim 11, wherein the dispersion further comprises less than 10% of a stabilizing agent by weight of the dispersion.

13. The device of claim 11, wherein the dispersion is free of a stabilizing agent.

14. The device of claim 11, wherein a color of the second set of charged particles is selected from the group consisting of red, green, blue, cyan, magenta, yellow, white, and black.

15. The device of claim 11, wherein the index of refraction of the fluid and the index of refraction of the first set of charged particles are between 1.51 and 1.57 at 550 nm.

16. The device of claim 11, wherein the device is disposed between two light-transmissive substrates.

* * * * *